(12) United States Patent
Kerai

(10) Patent No.: US 6,452,402 B1
(45) Date of Patent: *Sep. 17, 2002

(54) APPARATUS FOR DETERMINING THE TYPE OF EXTERNAL DEVICE BEING CONNECTED

(75) Inventor: Kanji Kerai, London (GB)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/452,814

(22) Filed: Dec. 1, 1999

(30) Foreign Application Priority Data

Dec. 1, 1998 (GB) ................................ 9826277

(51) Int. Cl.[7] ........................ H01H 31/04; H01H 31/02; G01N 27/00; G01R 1/04; G01R 19/00
(52) U.S. Cl. ..................... 324/538; 324/537; 324/539; 324/764; 324/71.1; 324/66; 324/158.1
(58) Field of Search ................................ 324/537, 538, 324/764, 539, 71.1, 66, 158.1

(56) References Cited

U.S. PATENT DOCUMENTS

| 4,468,612 A | 8/1984 | Starr ........................ 324/66 |
|---|---|---|
| 4,837,488 A | * 6/1989 | Donahue .................... 324/66 |
| 5,146,172 A | * 9/1992 | Mehr-Ayin et al. ......... 324/691 |
| 5,181,858 A | 1/1993 | Matz et al. ................. 439/188 |
| 5,535,371 A | 7/1996 | Stewart et al. .............. 395/500 |
| 5,774,741 A | 6/1998 | Choi .......................... 395/822 |
| 5,832,419 A | * 11/1998 | Voshell et al. .......... 324/764 X |
| 5,836,785 A | 11/1998 | Lee ............................ 439/505 |
| 6,002,331 A | * 12/1999 | Laor ....................... 324/66 X |

FOREIGN PATENT DOCUMENTS

| EP | 0695071 | 1/1996 |
|---|---|---|
| JP | 97233800 | 3/1997 |
| JP | 9074448 | 7/1997 |

* cited by examiner

*Primary Examiner*—N Le
*Assistant Examiner*—Wasseem H. Hamdan
(74) *Attorney, Agent, or Firm*—Antonelli, Terry, Stout & Kraus, LLP

(57) ABSTRACT

An electronic device comprising a processor 4 and a connector 2 for connecting an external device to the electronic device. The connector has a plurality of electrical contacts 23–27 at least one of which 23 is connected to the processor 4. The processor 4 is arranged to monitor the status of a first electrical contact 23 and to determine the type of external device connected to the connector 2 in dependence on the status of the first electrical contact 23.

11 Claims, 2 Drawing Sheets

APPARATUS FOR DETERMINING THE TYPE OF EXTERNAL DEVICE BEING CONNECTED

BACKGROUND OF THE INVENTION

This invention relates to an electronic device and in particular to a device having a connector for connecting an external device to the electronic device.

In the electronics industry today there is the need for interconnectability between devices. Connectors are therefore provided for allowing this. It is usual for a connector to be provided for each device to be connected.

SUMMARY OF THE INVENTION

According to the invention there is provided an electronic device comprising a processor and a connector for connecting an external device to the electronic device, the connector having a plurality of electrical contacts at least one of which is connected to the processor, the processor being arranged to monitor the status of at least a first electrical contact and to determine the type of external device connected to the connector in dependence on the status of the first electrical contact.

Thus a single connector may be provided which is suitable for connecting any one of a plurality of external devices, such as a charger or external power supply, a headset, a data device, an antenna or the like. Such a connector is relatively compact which is also desirable with portable electronic devices for which the tendency is for smaller and smaller devices.

Preferably the processor is arranged to monitor the status of the first contact in response to a signal from a second electrical contact. This second contact may simply be in the form of a switch which operates when the connector of an external device is connected to the connector of the electronic device.

Thus the processor therefore only needs to monitor the status of the first contact when the switch is triggered.

Preferably the processor is arranged to monitor the voltage of the first contact.

The processor may be arranged to configure itself in dependence on the type of external device deemed to be connected to the electronic device.

Alternatively the processor may configure another component of the electronic device in dependence on the type of external device deemed to be connected.

Information relating to configuration of the electronic device for specified external devices is preferably stored in memory means. Preferably this memory means is RAM so that further configuration details may be added as required.

According to a second aspect of the invention a processor is provided for receiving signals from a connector, the processor being arranged to monitor the status of at least a first electrical contact of the connector and to determine the type of external device connected to the connector in dependence on the status of the first electrical contact.

Preferably the processor is arranged to configure a device controlled by the processor in dependence on the type of external device deemed to be connected.

BRIEF DESCRIPTION OF THE DRAWINGS

The invention will now be described by way of example only with reference to the accompanying drawings, in which.

DETAILED DESCRIPTION OF THE INVENTION

Figure 1:
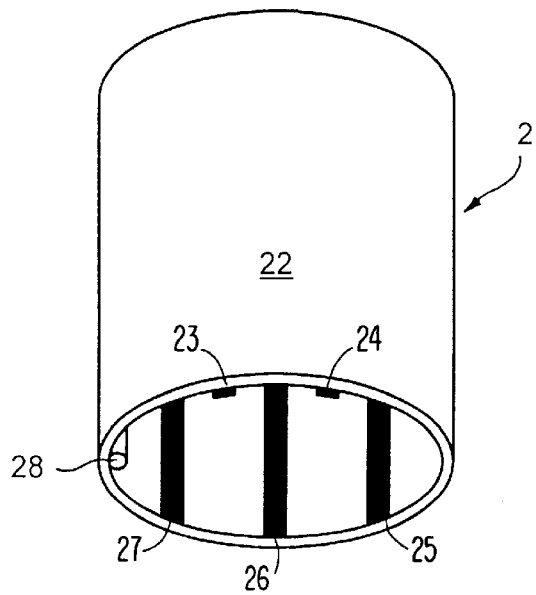
FIG. 1 shows a connector according to the invention.

As shown in FIG. 1 the connector 2 comprises a female body 22 and five electrical connectors 23, 24, 25, 26, 27. As is conventional with connectors, a protuberance 28 is provided to ensure that the corresponding electrical contacts of a male connector which is to be connected to the female connector 2 are orientated in the correct position. The electrical connectors 23 to 27 are disposed inside the perimeter of the connector body 22. Clearly the connector could have a male body.

Figure 2:
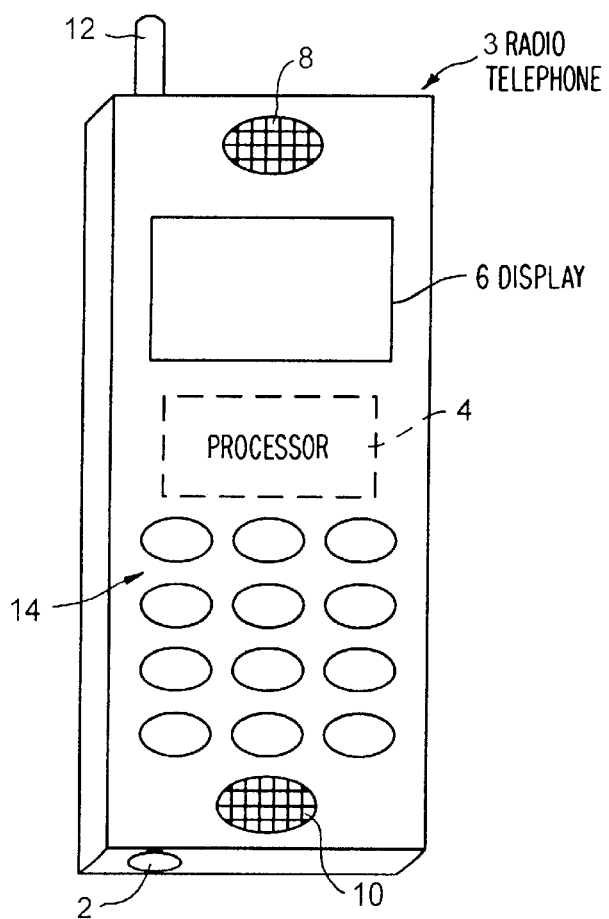
FIG. 2 shows an electronic device according to the invention.

FIG. 2 shows an electronic device according to the invention. The electronic device shown is a radio telephone but the invention is applicable to any electronic device. Some examples, without limitation, are personal organisers, computers, cameras, personal digital assistants etc. The radio (or mobile) telephone 3 has a connector 2, a processor 4, a display 6, a speaker 8, a microphone 10, an antenna 12 and a keypad 14.

Figure 3:
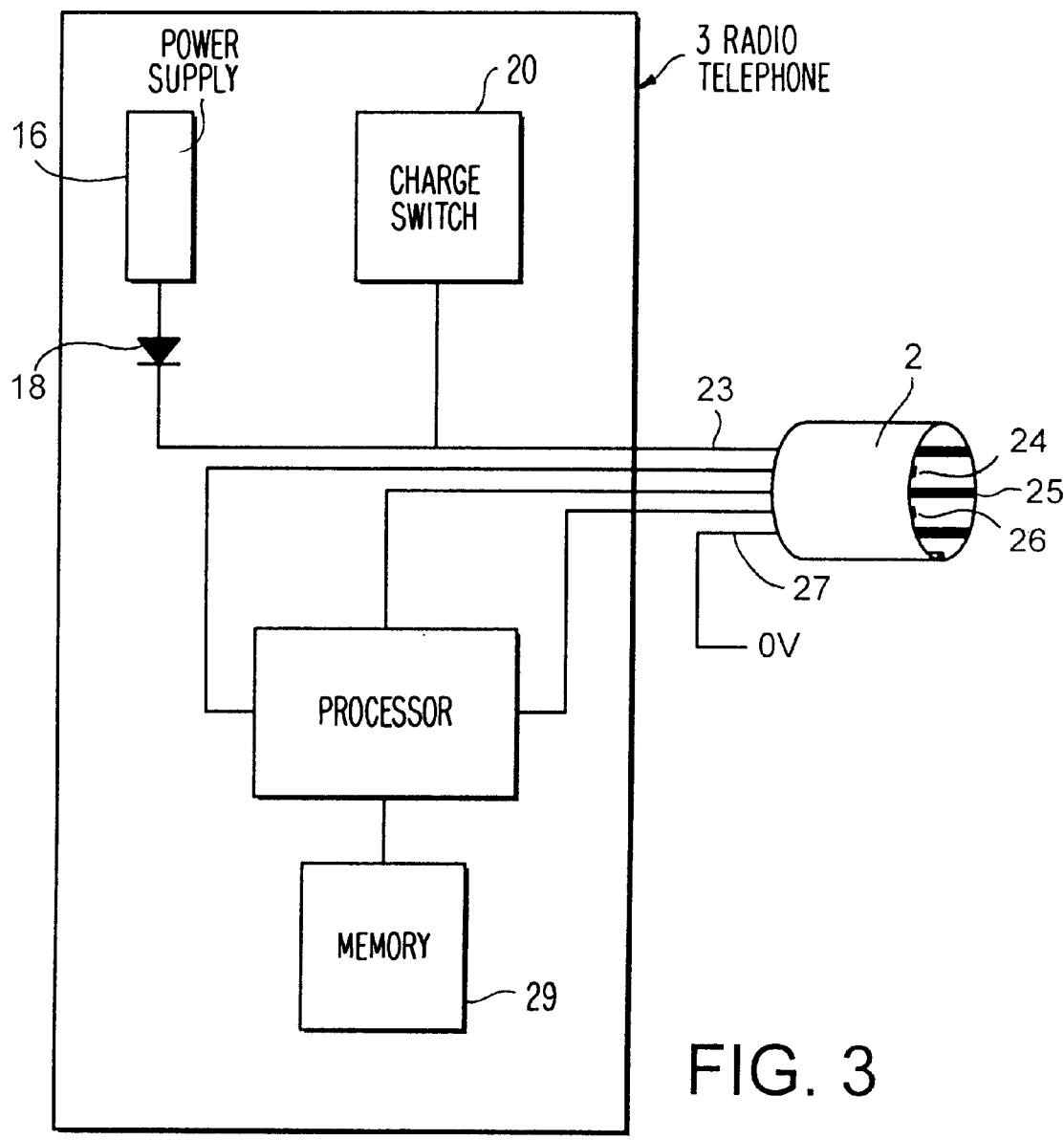
FIG. 3 the arrangement of the processor of the electronic device and the connector shown in FIG. 1.

FIG. 3 shows in detail the arrangement of the processor 4 and the connector 2. FIG. 3 only relates to those features of the processor that are particular to the present invention. Clearly the processor also carries out functions for the conventional operation of the device that are not illustrated here. At least one of the electrical contacts 23, 24, 25, 26, 27 of the connector is connected to the processor 4. The processor 4 is associated with a power supply 16 of 1.8V which is connected to the contact 23 via a diode 18 which prevents the flow of current back towards the power supply 16. Contact 27 is connected to 0V. The remaining contacts 24, 25, 26 are connected to the processor 4 which controls signals to and from these contacts in a manner to be described below.

The processor 4 monitors the voltage of the contact 23 and determines the type of external device connected to the electronic device via the connector 2. In the case of a mobile telephone as shown in FIG. 2, the most usual external devices that may be connected thereto are a headset, a charger for charging the battery (not shown) of the telephone and a data device such as a computer. The invention will be described with reference to these types of external devices although other devices may be connected.

The connector 2 is provided with sufficient contacts to cater for all expected types of external devices. For each type of external device which may be connected to the device 3, the processor has configuration information relating to the signal (if any) to be associated with each contact of the connector 2.

Table 1 shows an example of expected voltages on contact 23 for a mobile telephone and the device assumed therefrom:

TABLE 1

| | |
|---|---|
| <1.8 V | Headset |
| 5 V | Data device |
| >5 V | Charger |

The type of data device interface is conventionally Jbus or USB. Jbus is a data transfer interface used mainly in mobile phones manufactured for the Japanese market, which allows subscriber details to be downloaded into the memory of a mobile telephone. USB (Universal Serial Bus) is the well-known duplex interface used to transfer data between devices such as computers and printers, facsimile machines, telephones etc.

Thus the processor 4 monitors the voltage of the contact 23 and, in dependence on the voltage measured, determines whether an external device is a headset, a data device or a charger. Rather than continuously monitoring the voltage of the contact 23, a switch contact 25 is provided. When an external device is connected to the connector 2, a signal is passed to the processor 4 which causes the processor 4 to monitor the voltage of contact 23 and so determine the type of external device which has been connected.

Once the processor has determined the type of external device, the processor then configures itself as to the signals to be received and transmitted via the remaining contacts 24, 26. In the case of a mobile phone which may be connected to a headset, Jbus, USB or a charger the configurations are as follows:

TABLE 2

| Contact No. | Headset | Jbus | USB | Charger |
| --- | --- | --- | --- | --- |
| 24 | Out - earpiece | In - receive | D+ | In - PWDO (pulse width modulated output from charger) |
| 26 | In - microphone | Out - transmit | D− | No connection |

The processor or device is therefore configured such that the signals from or to the contacts 24 and 26 are dealt with appropriately with regard to the external device. Thus, when a headset is connected to the device, the voltage on contact 23 becomes 1.8V. This is detected by the processor 4 which then configures itself according to the characteristics for a headset i.e. that signals to the earpiece of the headset are to be sent via contact 24 and signals from the microphone of the headset are to be received via contact 26.

When a data device is connected, the voltage on contact 23 becomes 5V. This is detected by the processor 4 which then sends an acknowledge signal to the data device via contact 26 to ask the data device to identify itself. The processor then configures itself according to the characteristics for the identified data device e.g. for Jbus, signals to the data device are to be sent via contact 26 and signals from the data device are to be received via contact 24. The processor then treats signals from the data device appropriately.

When a charger is connected, the voltage on contact 23 becomes more than 5V. This is detected by the processor 4 which then configures itself according to the characteristics for a charger, i.e., that a charging signal from the charger is to be received via contact 24 and that this signal is to be directed to a charger switch 20.

The information shown in tables 1 and 2 is stored in a memory 29 associated with the processor 4. This memory, which is preferably RAM, may also be used to store other information of use to the processor 4.

Preferably the elements shown in FIG. 3 are implemented as an integrated circuit.

Although the invention has been described with reference to a mobile telephone to which a headset, a charger or a data device may be connected, it will be appreciated that the invention is applicable to any electronic device which requires interconnectivity with an external device. The device is configured dynamically in response to the connection of an external device and its subsequent identification.

What is claimed is:

1. A mobile electronic device comprising:

a processor;

a connector for connecting an external device to the electronic device, wherein the connector has a plurality of electrical contacts for variable cooperating with each of a plurality of different types of external devices when said mobile electronic device is set to one of a plurality of different configurations, wherein at least one contact of said plurality of electrical contacts is connected to the processor and is usable in the operation of a type of external device connected to said connector; and a memory for storing configuration information to be used by the processor to configure the electronic device to a configuration corresponding to a particular type of external device based on a voltage of the one contact of the connector, wherein the processor monitors the status of the one contact to determine the type of external device connected to the connector in dependence on the status of the one contact, and wherein the processor, based on the type of external device determined to be connected to the connector sets the mobile electronic device to a configuration corresponding to the type of external device using the configuration information stored in the memory, thereby configuring the mobile electronic device in a manner to operate appropriately with the type of external device connected to the connector.

2. An electronic device according to claim 1 wherein the processor is arranged to monitor the status of the first contact in response to a signal from a second electrical contact.

3. A device according to claim 2, wherein the electronic device is configurable to be connected to an external device which can be a headset, a charger or a data device.

4. A device according to claim 2, wherein the device is a portable device.

5. A device according to claim 2, wherein the device is a radio telephone.

6. A device according to claim 1, wherein the electronic device is configurable to be connected to an external device which can be a headset, a charger or a data device.

7. A device according to claim 6, wherein the device is a portable device.

8. A device according to claim 6, wherein the device is a radio telephone.

9. A device according to claim 1, wherein the device is a portable device.

10. A device according to claim 9, wherein the device is a radio telephone.

11. A device according to claim 1, wherein the device is a radio telephone.

* * * * *